United States Patent [19]

Weidner et al.

[11] Patent Number: 4,742,533
[45] Date of Patent: May 3, 1988

[54] SOFT DECISION DIGITAL COMMUNICATION APPARATUS

[75] Inventors: Michael Y. Weidner, Phoenix; Michael F. Durkin, Scottsdale, both of Ariz.

[73] Assignee: Motorola, Inc., Schaumburg, Ill.

[21] Appl. No.: 232

[22] Filed: Jan. 2, 1987

[51] Int. Cl.[4] .............................................. H03K 9/04
[52] U.S. Cl. ........................................ 375/85; 371/43; 375/96
[58] Field of Search ....................... 375/83, 84, 85, 86, 375/96; 371/43, 46; 329/104

[56] References Cited

U.S. PATENT DOCUMENTS

| | | | |
|---|---|---|---|
| 4,099,121 | 7/1978 | Fang | 455/12 |
| 4,242,641 | 12/1980 | Houdard | 329/126 |
| 4,320,499 | 3/1982 | Muilwijk et al. | 375/85 |
| 4,586,182 | 4/1986 | Gallagher | 371/43 |
| 4,691,318 | 9/1987 | Entenman | 371/43 |

Primary Examiner—Benedict V. Safourek
Attorney, Agent, or Firm—Maurice J. Jones, Jr.

[57] ABSTRACT

An apparatus for performing a soft decision function prior to convolutional decoding in a data communication system using differential quadrature-PSK or other transmission schemes is disclosed. A memory element coupled between a demodulator and the convolutional decoder in a receiver portion of the communications system performs the soft decision function. The memory element contains data organized using probability of occurrence and Log-Likelihood parameters for each potential combination of current and past received signal modulation quantized at a predetermined level.

14 Claims, 4 Drawing Sheets

| RECEIVED VECTOR | PROBABILITY OF OCCURRENCE | LOG-LIKELIHOOD | SOFT DATA |
|---|---|---|---|
| 0 | $P_0$ | $LL_0$ | — |
| 1 | $P_1$ | $LL_1$ | — |
| 2 | $P_2$ | $LL_2$ | — |
| 3 | $P_3$ | $LL_3$ | — |
| 4 | $P_4$ | $LL_4$ | — |
| 5 | $P_5$ | $LL_5$ | — |
| 6 | $P_6$ | $LL_6$ | — |
| 7 | $P_7$ | $LL_7$ | — |
| ↓ | ↓ | ↓ | ↓ |
| 4096 | $P_{4096}$ | $LL_{4096}$ | — |

| LOG-LIKELIHOOD | PROBABILITY OF OCCURRENCE | RECEIVED VECTOR | SOFT DATA |
|---|---|---|---|
| $LL_{2158}$ least | $P_{2158}$ | 2158 | — |
| $LL_{1365}$ | $P_{1365}$ | 1365 | — |
| $LL_{3722}$ | $P_{3722}$ | 3722 | — |
| $LL_{99}$ | $P_{99}$ | 99 | — |
| $LL_{1838}$ | $P_{1838}$ | 1838 | — |
| $LL_{701}$ | $P_{701}$ | 701 | — |
| $LL_{3359}$ | $P_{3359}$ | 3359 | — |
| $LL_{2884}$ | $P_{2884}$ | 2884 | — |
| ↓ | ↓ | ↓ | ↓ |
| $LL_{511}$ greatest | $P_{511}$ | 511 | — |

*FIG. 4B*

| PROBABILITY OF OCCURRENCE | LOG-LIKELIHOOD | RECEIVED VECTOR | SOFT DATA |
|---|---|---|---|
| $\Sigma P = 1/8$ | least | ≡≡≡ | 011 |
| $\Sigma P = 1/8$ |  | ≡≡≡ | 010 |
| $\Sigma P = 1/8$ |  | ≡≡≡ | 001 |
| $\Sigma P = 1/8$ |  | ≡≡≡ | 000 |
| $\Sigma P = 1/8$ |  | ≡≡≡ | 100 |
| $\Sigma P = 1/8$ |  | ≡≡≡ | 101 |
| $\Sigma P = 1/8$ |  | ≡≡≡ | 110 |
| $\Sigma P = 1/8$ | greatest | ≡≡≡ | 111 |

*FIG. 4C*

SOFT DECISION DIGITAL COMMUNICATION APPARATUS

BACKGROUND

This invention relates generally to digital communication systems which employ forward error correction (FEC) coding. More specifically, the present invention relates to a receiver in such a system where a quantized, soft decision data value is used in decoding the FEC coding.

Digital data communication systems may utilize any of several different transmission schemes. In one such scheme data is communicated using non-differentially encoded quadrature-PSK. In this scheme digital data at a transmitter of the system is first convolutionally encoded. The convolutional encoding increases the number of binary symbols required to carry the same information as is contained in the digital data prior to encoding, but allows a decoder at a receiver portion of the system to detect and correct errors.

Encoded data are separated into two bit pairs called symbols. The transmitter modulates a carrier signal in a manner defined by the symbols. In quadrature-PSK the carrier has in-phase (I) and quadrature (Q) components. Each bit of a symbol modulates one of the I or Q carrier components so that at the transmitter only one of four possible phase relationships exists between the I and Q components.

Figure 1A:
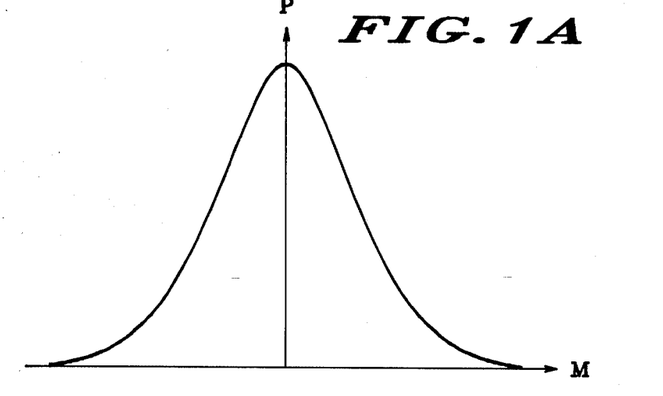
FIG. 1A illustrates the Gaussian noise distribution density function.

The information contained in the symbol-modulated carrier invariably becomes corrupted by noise in the transmission channel. Additive Gaussian noise typically describes the corruption which occurs to the carrier. FIG. 1A shows the Gaussian probability distribution function. The vertical axis of FIG. 1A describes the probability that noise of a given magnitude will occur. The horizontal axis represents the noise magnitude. Thus, a greater probability exists that low magnitude noise will affect the symbol-modulated carrier, but a finite probability exists that a large magnitude noise signal will be added to the symbol-modulated carrier.

Figure 1B:
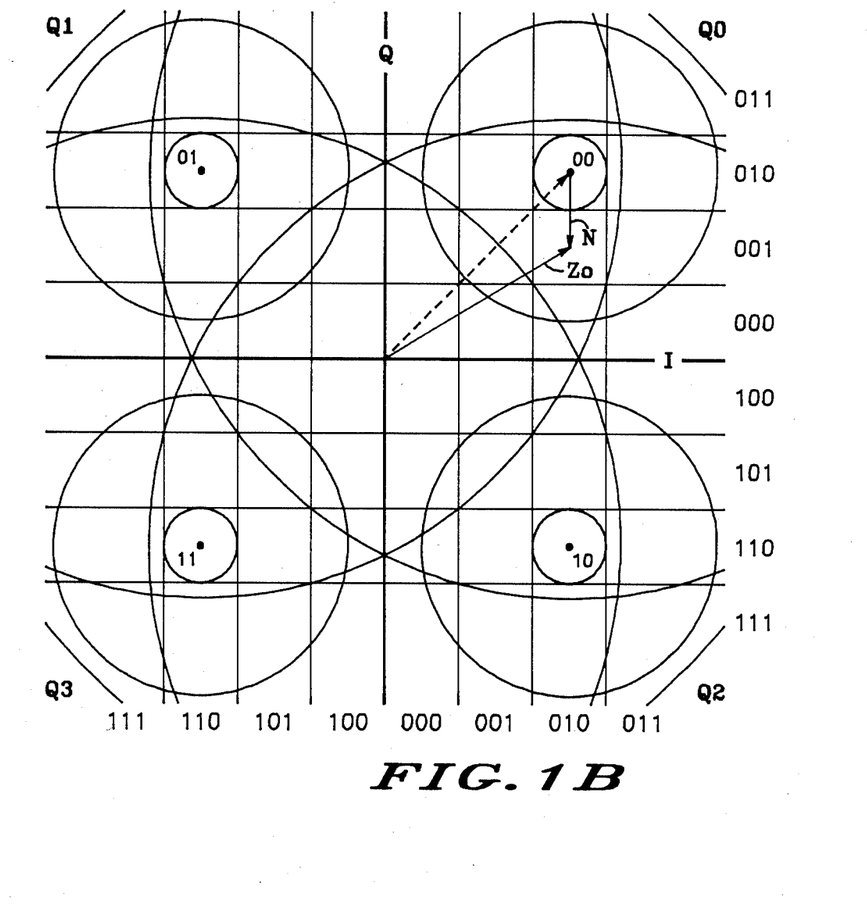
FIG. 1B represents a vector space which illustrates a non-differential quadrature-PSK data transmission scheme.

When this symbol-modulated carrier is received by a receiver portion of the system and demodulated, a structure is provided to decide what symbol was transmitted in spite of the fact that the received symbol invariably has been corrupted by noise. FIG. 1B illustrates the problem addressed by this structure. FIG. 1B shows a 2-dimensional vector space defined by axes I and Q, where I and Q represent the in-phase and quadrature components of a received carrier. For quadrature-PSK communication, in which each symbol contains 2 bits of information, the transmitter modulates the carrier to produce only one of four possible transmitted vectors. This transmitted vector is centrally located in one of four quadrants. The four quadrants are defined in FIG. 1B so that if quadrant 0 resides from 0°–90° counterclockwise from the I axis, then quadrant 1 resides from 90°–180°, quadrant 3 resides from 180°–270°, and quadrant 2 resides between 270°–360°. The quadrant number reflects the symbol value which modulates the carrier. For example, as shown in FIG. 1B both the I and Q components of the carrier are positively modulated and the transmitted vector shown in phantom, which is located in quadrant 0, results. Thus, a symbol of 00 is being communicated. On the other hand, if the I component were negatively modulated while the Q component were positively modulated then the resulting transmitted vector would reside in quadrant 1 and a symbol of 01 would be communicated.

The additive Gaussian noise which corrupts the transmitted symbol is illustrated in FIG. 1B by concentric circles centered at the coordinates for each of the four possible transmitted vectors. A greater probability exists that low magnitude noise will add to the transmitted vector, but a distinct finite probability exists that a large magnitude noise vector may add to the transmitted vector. Accordingly, a noise vector N shown in FIG. 1B represents one of an infinite number of possible noise signals that may corrupt the transmitted vector (shown in phantom). The resulting received vector is shown at $Z_0$.

The receiver quantizes the received signal to define the coordinates of the received vector. In FIG. 1B quantization is shown as having eight levels, or three bits, for each of the I and Q axes. The received vector shown in FIG. 1B may be described as having an I axis coordinate of 010 and a Q axis coordinate of 001. On the other hand, had the transmitted signal been received with only a small amount of corruption by noise, which is a slightly more probable situation since the noise follows a Gaussian distribution function, the received vector could have had an I axis coordinate of 010 and a Q axis coordinate of 010.

The soft decision problem arises from assigning a level of confidence to a decision that a particular symbol was transmitted given the fact that a specific received vector has been detected. For the example shown in FIG. 1B one may be relatively confident that a symbol of 00 was transmitted, even though a small probability exists that a large magnitude noise vector caused any of the other three possible transmitted symbols to be received with the same received vector coordinates.

For the non-differential quadrature-PSK situation described in FIG. 1B, this soft decision is not extremely complicated. The soft decision merely reflects the "closeness" of the received vector to the nearest one of the four possible transmitted vectors in a vector space, such as that shown in FIG. 1B. The quadrant number of the received vector represents a "hard decision". Using the coding scheme shown in FIG. 1B, this quadrant number is obtained by selecting the most significant bit of the I and Q coordinates of the received vector. The remaining 4 bits which describe the received vector coordinates provide extra information reflecting the quality of this hard decision. For the coding scheme shown in FIG. 1B, the greater the magnitude of the least significant 2 bits for each of the I and Q coordinates, the higher the quality, or the greater the confidence, in this hard decision. Accordingly, a soft decision data value may be supplied through proper coding of the quantization levels of a vector space.

A convolutional decoder portion of a receiver inputs this soft decision data, which is 3 bits for the I coordinate and 3 bits for the Q coordinate in the example depicted in FIG. 1B, and outputs a data sequence. The data sequence output by the convolutional decoder has a very high probability of precisely equaling the data sequence which the transmitter's convolutional encoder encoded. The extra information presented to the convolutional decoder beyond the information needed to describe a hard decision helps the decoder to improve an error rate of this data sequence.

In transmitting data using non-differential quadrature-PSK, a reference phase relationship between I and Q components of the carrier must first be established before data may accurately be detected by the receiver. Thus, non-differential quadrature-PSK experiences a problem if this reference relationship is lost during the transmission of data. When this happens all data subsequent to the loss of reference will remain bad until the reference is re-established through a synchronization process. This problem is known as "cycle slip".

One solution to the problem of cycle slip uses differential encoding as opposed to non-differential encoding. In differential encoding the reference relationship between the I and Q components of the carrier is established, not through a synchronization process, but from an immediately previous, received symbol. In other words, the transmitted information is represented by a phase change in the I-Q relationship of a current symbol relative to the immediately previous symbol, where the immediately previous symbol represents the symbol which occurred in the past and is adjacent in time to the current symbol. For example, a conventional coding scheme for differential quadrature-PSK defines a counterclockwise phase change of 90° as a symbol of 01, a counterclockwise phase change of 180° as a symbol of 11, a counterclockwise phase change of 270° as a symbol of 10, and a counterclockwise phase change of 0° or 360° as a symbol of 00.

In this differential scheme if an event happens which causes an error in the reference relationship, such error will affect only one subsequent symbol. Since an error in a single symbol may easily be corrected using the convolutional encoding and decoding, differential encoding may represent a more reliable scheme.

However, in transmitting the differentially encoded data both the reference symbol, which is the immediately previous symbol, and the current symbol are corrupted by noise. Furthermore, since additive Gaussian noise characterizes the corruption, the relationship between the corruption of two successive samples is statistically independent. Consequently, the uncertainty related to determining precisely what data was in fact transmitted increases.

The receiver demodulation must be modified for a differential data receiver from that of a non-differential data receiver. With differential data, a phase relationship must be established from an immediately previous symbol. Likewise, the soft decision function becomes more complicated due to the fact that the same uncertainties which affect a current symbol also affected the immediately previous symbol.

SUMMARY OF THE INVENTION

Accordingly, it is an object of the present invention to provide an apparatus which improves upon the known soft decision techniques and can be applied to any of a wide variety of data transmission standards.

Another object of the present invention concerns providing a simple, reliable, hardware implementation of an apparatus which provides a soft decision function.

Yet another object of the present invention concerns providing an apparatus which is compatible with existing transmission schemes and existing convolutional decoding methods.

Another object of the present invention concerns providing an apparatus that implements a soft decision function to improve error rates in data transmission generally and in differential quadrature-PSK data transmission specifically.

The above and other objects and advantages of the present invention are carried out in one form by an apparatus having a demodulator, a memory element, and a convolutional decoder. The demodulator has a quantized output which couples to an address input of the memory element. An output of the memory element couples to the convolutional decoder. The quantized output of the demodulator exhibits a predetermined quantization grain and provides a digital data value representing one of a finite multiplicity of unique received vector values. This one received vector value addresses at least one of a unique multiplicity of data words which are stored in the memory element.

BRIEF DESCRIPTION OF THE DRAWINGS

A more complete understanding of the present invention may be derived by reference to the detailed description and claims when considered in connection with the accompanying drawings, wherein like reference numbers indicate similar features throughout the drawings.

DETAILED DESCRIPTION OF THE PREFERRED EMBODIMENT

Figure 2:
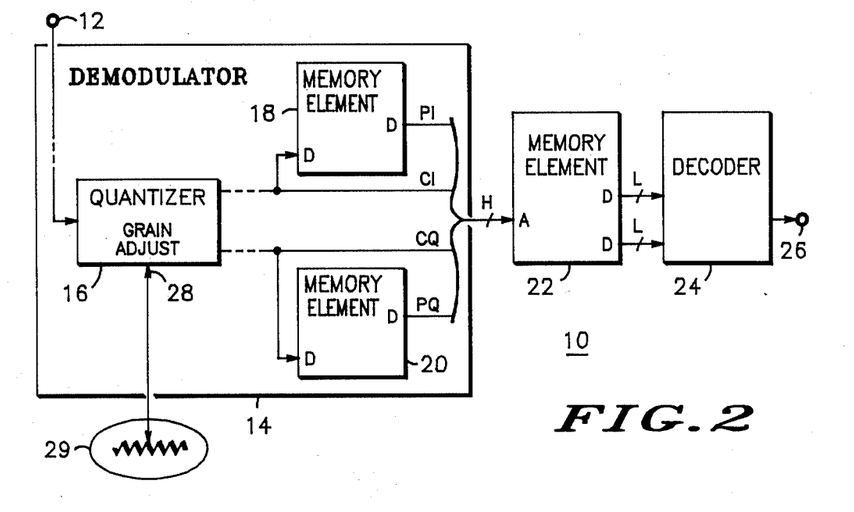
FIG. 2 shows a hardware implementation of the present invention in block diagram form.

FIG. 2 shows a block diagram of a received-signal processing apparatus 10. A received signal which is obtained from a modulated carrier is applied at an input terminal 12. Input terminal 12 couples to an input of a demodulator 14. Demodulator 14 represents a coherent demodulator in the preferred embodiment and contains conventional circuits such as a mixer (not shown), and matched filters (not shown) which are used in a conventional manner. A quantizer 16 resides at some point within a signal flow path of the received signal within demodulator 14. Quantizer 16 may reside at any one of several places in the demodulator. For example, matched filters may be located either before or after quantizer 16 in the signal flow path. Quantizer 16 represents an analog-to-digital converter which outputs a digital representation of an analog signal provided to an input of quantizer 16. A first output from quantizer 16 couples to a data input of a memory element 18 and to an output of demodulator 14. Likewise, a second output of quantizer 16 couples to a data input of a memory element 20 and to the output of demodulator 14. A data output of memory element 18 couples to the output of demodulator 14, and a data output of memory element 20 couples to the output of demodulator 14.

The first and second outputs of quantizer 16 which couple to memory elements 18 and 20, respectively, provide information which describes in-phase and quadrature components, respectively, of the received signal.

The data inputs of memory elements 18 and 20 couple to these in-phase and quadrature outputs, respectively. Memory elements 18 and 20 are controlled within demodulator 14 so that they contain information about an immediately previous symbol when demodulator 14 processes a current symbol. Accordingly, the output from demodulator 14 represents a digital signal which is presented in H, where H represents a positive integer number, bits of data. Furthermore, this digital signal consists of four separate portions. Two portions provide information related to current in-phase and quadrature components of the received signal. Two portions provide information related to in-phase and quadrature components of the immediately previous symbol. In the preferred embodiment H equals 12, and the four portions contain 3 bits each.

A memory element 22 has an address input which couples to the output of demodulator 14. As used herein, a memory element, such as memory elements 22, 18, or 20, may include multiple memory devices or only a portion of a single memory device such as a RAM, PROM, latches, registers, shift registers, or the like. In the preferred embodiment, memory element 22 represents a PROM memory while memory elements 18 and 20 represent simple registers.

Memory element 22 has two data outputs each of which are presented in L, where L represents a positive integer number, bits. Both outputs couple to an input of a convolutional decoder 24. One of the outputs provides information related to a most significant bit of data encoded in a communicated symbol, and the other output provides information related to a least significant bit of data encoded in a communicated symbol. Convolutional decoder 24 represents a conventional decoder which is used in a conventional manner. An output of decoder 24 couples to an output terminal 26, which supplies an output signal from the present invention. This output signal has a high probability of equaling a sequence of data which is intended to be communicated.

Quantizer 16 of demodulator 14 additionally contains a grain adjustment input 28 which couples to a reference signal source 29. The grain of quantizer 16 represents the amount of change in the analog signal input to quantizer 16 which forces a one least significant bit change in the output signal from quantizer 16. When the grain of quantizer 16 increases, a greater analog signal change is required before the output of quantizer 16 will change one least significant bit. Accordingly, a signal from reference signal source 29 energizes the grain adjustment input of quantizer 16 so that signals output from quantizer 16 will exhibit a predetermined grain. Reference signal source 29 may advantageously represent a center tap of a potentiometer which is coupled between terminals that supply a stable voltage difference.

Figure 3:
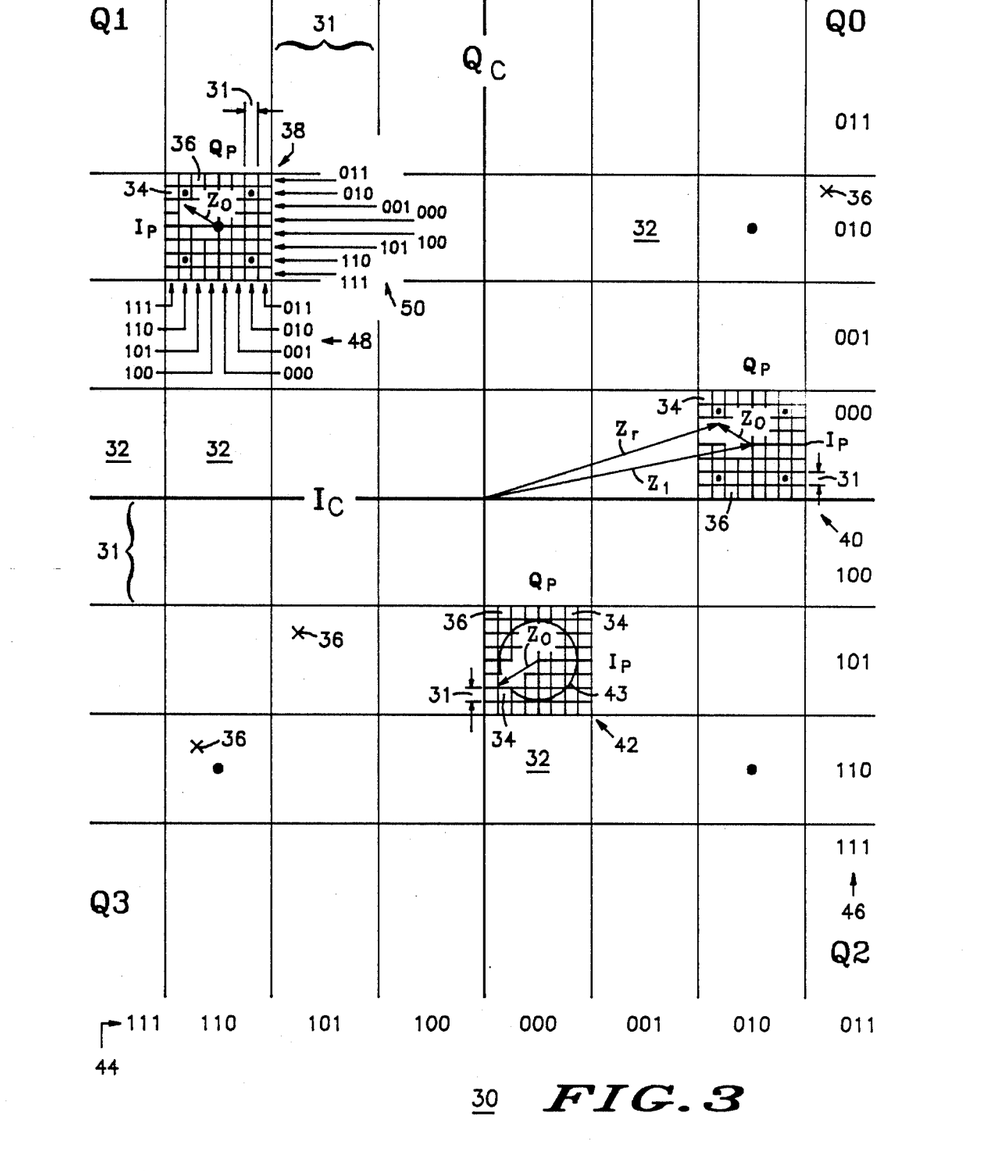
FIG. 3 illustrates a vector space applicable to differential, quadrature-PSK.

FIG. 3 shows a vector space 30 which illustrates operation of the present invention when differentially encoded quadrature-PSK data is communicated. Vector space 30 may be partially characterized as a two-dimensional space which is defined by orthogonol axes $I_c$ and $Q_c$. The inphase component of the current symbol may be plotted on axis $I_c$, and the quadrature component of the current symbol may be plotted on axis $Q_c$. These two axes divide vector space 30 into four quadrants. A quadrant $Q_0$ exists from 0°–90° counterclockwise from axis $I_c$, a quadrant $Q_1$ exists from 90°–180°, a quadrant $Q_3$ exists from 180°–270°, and a quadrant $Q_2$ exists from 270°–360°.

In the preferred embodiment each of the $I_c$ and $Q_c$ axes are divided into eight sections. Accordingly, vector space 30 contains a quantity 64 of current cells 32. A distance 31 between sections corresponds to the grain of quantizer 16 (see FIG. 2). However, a set of current cells 32 which are shown around the perimeter of vector space 30 do not reflect this distance because all analog signals input to quantizer 16 (see FIG. 2) which are greater than a predetermined value are represented as being of a maximum magnitude, regardless of their actual magnitude.

A quantity 64 of past cells 34 resides within each of the 64 current cells 32. In other words, each of current cells 32 within vector space 30 contains its own vector space which represents an immediately previous symbol. This "past" vector space may advantageously be characterized by orthogonol axes $Q_p$ and $I_p$ which represent quadrature and in-phase components of the immediately previous symbol received by the present invention. In FIG. 3 past cells 34 are shown within current cells 32 for only 3 of the 64 current cells 32 so that FIG. 3 may remain understandable. Nevertheless, each of the 64 current cells 32 contains 64 of past cells 34.

Accordingly, vector space 30 contains a finite multiplicity of unique compartments 36. Each compartment is unique because each compartment resides at a unique location in vector space 30. The preferred embodiment contains 4,096 of compartments 36. Each of the 4,096 compartments 36 may be uniquely identified by a received vector value representing the coordinates of each compartment 36. In the preferred embodiment the received vector value is a 12 bit number. Three of the 12 bits represent an $I_c$ coordinate 44, 3 bits represent a $Q_c$ coordinate 46, 3 bits represents an $I_p$ coordinate 48, and 3 bits represent a $Q_p$ coordinate 50. These $I_p$ and $Q_p$ coordinates are provided by the output signal from demodulator 14, as discussed above in connection with FIG. 2.

Current cells 38 and 40, for which past cells 34 are shown, show the orientation of axes $Q_p$ and $I_p$ relative to axes $Q_c$ and $I_c$ for coherent demodulation. On the other hand, a current cell 42 depicts a non-coherent demodulation situation for the past vector space. For non-coherent demodulation no fixed reference exists between $Q_p/I_p$ axes and a received vector value. Hence, in current cell 42, a circular region 43 around a center at the intersection of the $Q_p$ and $I_p$ axes represents a region of most probable received vector values. Circle 43 depicts the entire set of received vector values which would occur if transmitted symbols were not corrupted by noise. Non-coherent demodulation differs from coherent demodulation in that circle 43 characterizes the most probable received vector values rather than the four points which characterize coherent demodulation and are described above in connection with FIG. 1B.

An immediately previous symbol may be represented as a vector within each of current cells 32, as shown at vectors $Z_0$ in FIG. 3. These vectors extend from the origins of the past vector spaces within each of current cells 32 to a unique one of the 64 past cells 34. When a current symbol occurs, a vector, such as vector $Z_1$ shown in FIG. 3, may be represented as extending from the origin of the current vector space to the origin of that past vector space within a current cell 32 which is indicated by the current symbol. A resulting received vector value represents the sum of these two vectors, as shown at $Z_r$ in FIG. 3.

With non-differential quadrature-PSK communication, the location and direction of a received vector directly relates to both hard and soft decisions which result from the received signal. However, with differential quadrature-PSK the direction and magnitude of resulting vectors $V_r$ bears no direct relationship to the hard and soft decisions which should be generated as a result of the received signal. Accordingly, the present invention uses memory element 22 (see FIG. 2) to perform a mapping function between the vector space depicted in FIG. 3 and desired soft and hard data outputs.

Figure 4A:
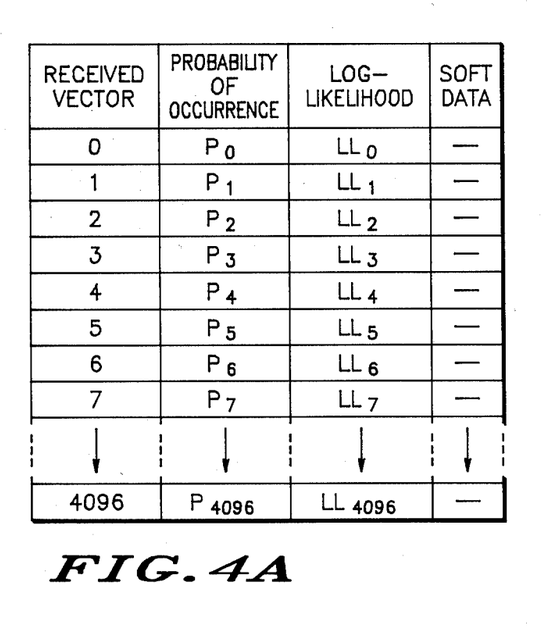
FIG. 4A shows a table of data useful in programming a memory element portion of the invention shown in FIG. 2.

FIG. 4A shows a table that explains a process for organizing data within memory element 22 to achieve this mapping function. FIG. 4A describes calculations which may advantageously be performed so that this data may be so organized. As shown in FIG. 4A, a probability of occurrence parameter and a Log-Likelihood parameter can be calculated for each of compartments 36 (see FIG. 3), or received vector values. Since $2_{12}$, or 4096, unique received vector values are producible at the output of demodulator 14 (see FIG. 2) in the preferred embodiment, 4096 probability of occurrence calculations and 4096 Log-Likelihood calculations are used. Furthermore, table 4A describes an operation which occurs for each bit of the transmitted symbol. Thus, for quadrature-PSK these calculations occur once for the most significant bit of the symbol pair and once for the least significant bit of the symbol pair. Since the calculation procedure is the same for each bit, this procedure and FIGS. 4A-4C will be described below with reference to only one of the bits. Those skilled in the art can easily apply the procedure to the other bit.

The probability of occurrence parameter represents the likelihood of demodulator 14 providing an output which describes a received vector value as being in a given compartment 36 (see FIG. 3), without consideration for whether a 0 or a 1 was transmitted. In other words, for each possible received vector value, the probability of occurrence describes the probability that such received vector value will occur. As discussed above in connection with FIG. 1B, this probability may be obtained by referring to the Gaussian distribution function in view of the fact that only four equally likely carrier modulation states are transmitted during each of the current and immediately previous symbols.

A scale factor which establishes a magnitude relationship between the Gaussian density function and the signal portion of a received signal may be obtained from a signal-to-noise ratio which is given as a part of system design specifications. For example, system design specifications typically require operation at a predetermined bit error rate in the presence of a predetermined signal-to-noise ratio. This predetermined signal-to-noise ratio may advantageously define the relationship between the Gaussian density function and the amplitude of received signals.

The probability of occurrence calculations are complicated due to the use of differential encoding. However, the probabilities of occurrence for each cell may be computed by calculating probabilities for each current cell 32 (see FIG. 3) within the current cell space without consideration of past cell space. This requires 64 calculations in the preferred embodiment. Then, these current cell space probabilities of occurrence may be assigned to corresponding locations for past cells 34 (see FIG. 3) in each of current cells 32. Thus, at this step each of the 64 current cells 32 will contain a set of 64 probabilities of occurrence for the past cells 34. Finally, each of the past cell probabilities may be weighted by the associated current cell probabilities to obtain a probability of occurrence for each of compartments 36, or each of the possible received vector values.

The Log-Likelihood parameter is well-known to those skilled in the art, and repeated here for convenience.

$$\log\left(\frac{P_r(S = 0|R_m)}{P_r(S = 1|R_m)}\right) \quad (1)$$

The numerator in equation 1 represents the probability that the bit of interest in the symbol was transmitted as a 0 given the fact that a particular received vector value $R_m$ has been received. The denominator of the Log-Likelihood expression represents the probability that the bit of interest in the symbol was transmitted as a 1 given the fact that a particular received vector value has been received. This parameter represents a ratio of "a posterior" probabilities. However, as known to those skilled in the art, "a prior" probabilities are easier to calculate and the ratio contained in equation (1) equals a corresponding ratio of a priori probabilities when the probability of a 0 being transmitted in a symbol equals the probability of 1 being transmitted in the symbol. Since this is typically the case in digital communications, the Log-Likelihood ratio may also be represented as $$\log\left(\frac{P_r(R_m|S = 0)}{P_r(R_m|S = 1)}\right) \quad (2)$$

The numerator in equation 2 represents the probability of occurrence for a particular received vector value given the fact that a 0 is being transmitted. The denominator represents the probability of occurrence for a particular received vector value given the fact that a 1 is being transmitted. The probabilities of equation 2 may be calculated in a manner similar to that described above for calculating probabilities of occurrence. However, since the probabilities assume that a 0/1 is being transmitted as the bit of interest in the current symbol, only two equally likely symbols, characterize transmission in the current vector space. Four equally likely symbols characterize the past vector space transmission.

Although the preferred embodiment describes a coherent demodulation system, the teachings provided herein apply to non-coherent demodulation as well. For non-coherent demodulation the same techniques and hardware are used as those described above for coherent demodulation. However, in applying these techniques to non-coherent demodulation, different probabilities of occurrence and Log-Likelihood values will associate with each received vector value than associates with received vector values for coherent demodulation.

Figure 4B:
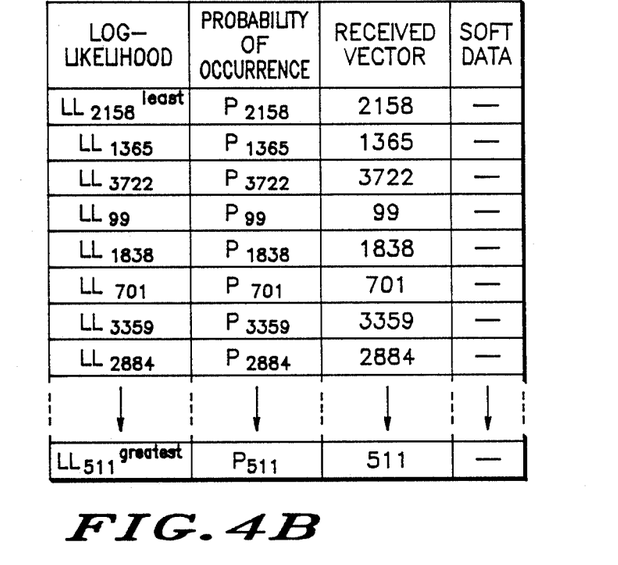
FIG. 4B shows a table of data useful for programming the memory element shown in FIG. 2.

After the probability of occurrence and Log-Likelihood parameters have been calculated for each of the potential received vector values, whether coherent or non-coherent demodulation, the data which is illustrated in FIG. 4A is sorted according to the Log-Likelihood values, as shown in FIG. 4B. This sort arranges the received vector values and probabilities of occurrence so that the Log-Likelihood parameters are a monotonic increasing, or decreasing, function of the Log-Likelihood data in the table. Accordingly, either the smallest Log-Likelihood value is the first entry in the table, with an associated probability of occurrence and a received vector value, and the greatest Log-Likelihood value is the last entry in the table, with an associated probability of occurrence and a received vector value, or vice-versa. As a result of this sorting operation the received vector values are scrambled. The values shown in FIG. 4B are examples given to illustrate the "scrambled" result after this sort. Actual sorting results need not produce this order.

The Log-Likelihood calculation as discussed above in connection with FIG. 4A is sufficient, but not a necessary calculation in the present invention. The Log-Likelihood parameter is a well understood characterization of a set of data. However, those skilled in the art will recognize that for the purposes of performing a sort as described in connection with FIG. 4B, other types of calculations may be performed rather than the Log-Likelihood calculation so long as substantially the same ordering of data occurs as a result of this sort.

Generally speaking, in the context of the present invention the Log Likelihood parameter describes the probability that a 0 was transmitted as the bit of interest in the symbol given the fact that a particular received vector value resulted, for each of the possible received vector values. Then, the sorting operation shown in FIG. 4B arranges the data so that received vector values in which a high probability exists that a 1 was transmitted are placed at one end of the table. Received vector values in which a high probability exists that a 0 was transmitted are placed at the other end of the table. Accordingly, when received vector values at one end of the table occur, one can be confident that a zero was transmitted, when received vector values at the other end of the table occur one can be confident that a 1 was transmitted, and when received vector values in the middle of the table occur one can have only low confidence in the fact that either one of a 0 or 1 was transmitted.

Figure 4C:
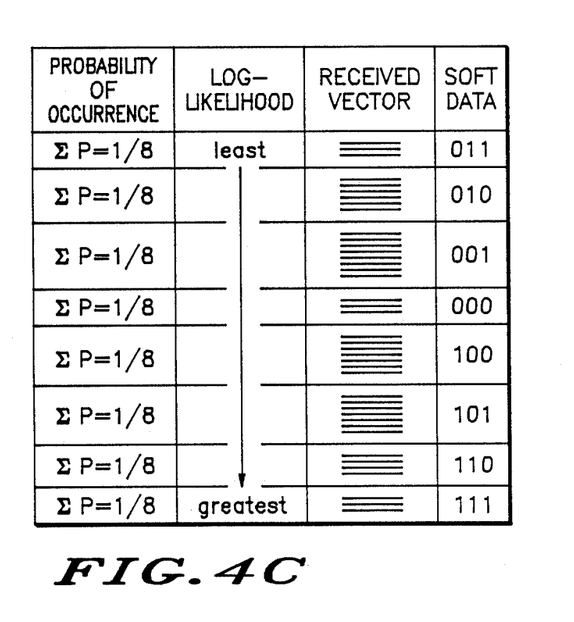
FIG. 4C shows a table of data useful in programming data for the memory element shown in FIG. 2.

FIG. 4C shows the formation of mutually exclusive vector groups, and the assigning of soft data values to these mutually exclusive vector groups. As shown in FIG. 2, memory element 22 produces an output consisting of L bits for each of the MSB and LSB of the symbol. In the preferred embodiment L-3. Thus, in the preferred embodiment memory element 22 can produce only 1 of a maximum of 8 unique soft data values when addressed by any one of the 4096 different received vector values.

The grouping seeks to present the greatest amount of information possible to decoder 24 (see FIG. 2). This can be best accomplished when each of the soft data values presented to decoder 24 from memory element 22 occurs with approximately equal frequency. Accordingly, received vector values are grouped together so that the sum of their corresponding probabilities of occurrence approximately equals $\frac{1}{2}^L$, or $\frac{1}{8}$ in the preferred embodiment.

As a result of the grouping, the number of received vector values associated with each mutually exclusive vector group need not equal the number of received vector values as associated with any other mutually exclusive vector group. Furthermore, each received vector value within a mutually exclusive vector group exhibits no convenient relationship to the other received vector values within that mutually exclusive vector group.

Once the groups have been formed, a unique soft data value may be assigned to each group. The soft data value assignments shown in FIG. 4C represent a conventional soft data input recognized by convolutional decoders. In this data assignment the most significant bit represents the hard decision, or whether the transmitted bit of interest was more likely a 0 or a 1. The two least significant bits provide information about the quality of the hard decision. A 00 in the two least significant bits represents a low confidence soft decision and a 11 in the two least significant bits represents a high confidence decision. The high confidence 0 assignment (011) is given to the mutually exclusive vector group at one end of the table while the high confidence 1 assignment (111) is given to the mutually exclusive vector group at the other end of the table. Low confidence 0 and 1 assignments are given to the mutually exclusive vector groups in the middle of the table.

Once the soft data values have been assigned, the soft data values may be written into memory element 22 (see FIG. 2). The received vector values represent address inputs to memory 22 and the soft data value represents data written into memory element 22. The probability of occurrence and Log-Likelihood parameters are now discarded.

Accordingly, $2^L$, or 8 in the preferred embodiment, unique soft data values are produced by memory element 22. Memory element 22 is organized so that each of the soft data values will occur at a frequency substantially equal to the frequency of occurrence of any other soft data value. Since the mutually exclusive vector groups were formed from sorted Log-Likelihood parameters, the Log-Likelihood parameter associated with each received vector value exhibits a value which is close to the value exhibited by all other Log-Likelihood parameters associated with received vector values in the given mutually exclusive vector group. In other words, the deviation of a Log-Likelihood parameter for each received vector value within a single mutually exclusive vector group, form an average over all Log-Likelihood parameters for that vector group, is less than the deviation of all Log-Likelihood parameters for received vector values of other vector groups from the average.

The above probability of occurrence and Log-Likelihood parameters depend upon a predetermined quantization grain. If the quantization grain changes, then Log-Likelihood and probability of occurrence parameters change as well. In order to optimize the mutually exclusive vector groups, the quantizer grain may advantageously be adjusted so that a maximum amount of information is presented in the vector map (see FIG. 3). For example, if the quantization grain is very small, then received vector values occurring in perimeter cells of the current and past vector maps would occur more often than received vector values in other cells. Likewise, if the quantization grain were very large then inner cells of the current and past vector maps would tend to occur more often than the perimeter cells. Accordingly, quantization grain may be optimized so that inner and outer, current and past cells tend to occur at an approximately equal frequency.

An $R_{comp}$ parameter provides one method of optimizing the quantization grain. $R_{comp}$ is a parameter well-known to those skilled in the art, and may be calculated as follows:

$$-\log_2\left[\sum_{m=0}^{2^L-1}\left[\frac{1}{2}\sum_{K=0}^{1}\sqrt{P_r(m|K)}\right]^2\right] \quad (3)$$

In equation 3 "m" represents a mutually exclusive group and the inner most term represents the probability of a particular received vector value occurring given the fact that K=0 was transmitted or K=1 was transmitted. This innermost term may be calculated using techniques similar to those described above in connection with calculating probability of occurrence and Log-Likelihood parameters. Accordingly, grain distances 31 (see FIG. 3) may be mathematically varied and the $R_{comp}$ calculation repeated until an optimum solution for quantization grain 31 is found as indicated by a maximized $R_{comp}$.

Although the relationship between received vector value and soft data value may be difficult to predict, symmetry of the soft data values programmed within memory element 22 (see FIG. 2) may be exploited to lessen memory requirements if necessary. For example, the current vector space portion of vector space 30 (see FIG. 3) may be rotated relative to the past vector space portion so that past received vector $Z_0$ always resides in a specific quadrant relative to the current vector space. Additionally, referring to FIG. 3, the most significant and least significant bits of data within a communicated symbol have a symmetrical pattern which may be exploited by reflecting past received vector $Z_0$ and current received vector $Z_1$ about the lines $Q_p=I_p$ and $Q_c=I_c$. Third, the negation of current received vector $Z_1$, with past received vector $Z_0$ unchanged, produces the correct magnitude but wrong sign for the soft decision values written in memory element 22 (see FIG. 2). The wrong sign can then be easily corrected at the output of memory element 22. Accordingly, referring to FIG. 2, additional logic may be included in the present invention between demodulator 14 and memory element 22 and between memory element 22 and decoder 24 to take advantage of symmetry and reduce memory requirements.

In the above description data words within memory element 22 are substantially organized according to the teaching presented herein. Those skilled in the art will recognize that with 4096 different received vector values as described in association with the preferred embodiment, any single received vector value by itself is not likely to occur. Accordingly, if a small number of received vector values do not produce soft decision values assigned precisely as taught herein, system performance will suffer only an insignificant amount. Furthermore, the use of slightly different equations may produce slightly different results than those described above. For example, one may use a "channel capacity" parameter rather than the $R_{comp}$ parameter to optimize quantization grain. Likewise, the quantization grain need only be substantially maximized. Due to the statistical nature and large number of potential received vector values, small changes in quantization grain from the optimum will have only an insubstantial effect upon performance.

Thus, the present invention provides a simple and reliable hardware implementation of a soft decision function which operates with differential quadrature-PSK communication or other less complicated forms of communication. Furthermore, the soft decision output provided by memory element 22 is compatible with existing transmission standards and decoding methods. Additionally, the use of a soft decision function as taught and implemented herein permits an improvement of approximately 2 dB in the energy per bit divided by noise ($E_b/N_O$) ratio which is conventionally used to measure performance in a communication system.

The foregoing description uses a preferred embodiment to illustrate the present invention. However, those skilled in the art will recognize that many changes and modifications may be made in this embodiment without departing from the scope of the present invention. For example, the teaching of this invention may be applied to non-differential, quadrature phase shift keying, either differential or non-differential BPSK, or a wide variety of other data transmission schemes. Furthermore, other conventional elements known to those skilled in the art may be included in a communication system which includes the present invention. For example, an interviewer may be inserted between memory element 22 and decoder 24.

Additionally, memory element 22 could be implemented using RAM containing data which is dynamically updated to maximize performance based on actual signal-to-noise conditions. These and other modifications obvious to those skilled in the art are intended to be included within the scope of this invention.

What is claimed is:

1. A received-signal processing apparatus for use in a system which communicates convolutionally encoded data, said apparatus comprising:

a demodulator having a quantized output exhibiting a predetermined quantization grain and being presented in H output bits, where H represents a positive integer number and the quantity represented by $2^H$ equals the number of unique received vector values which are producible at the output of said demodulator, and the H output bits are for collectively providing data representing one of a finite multiplicity of unique received vector values;

a memory element having an address input coupled to said demodulator output so that the one received vector value provided by the output of said demodulator addresses at least one of a unique multiplicity of data words of said memory element, and said memory element having a data output presented in L output bits, where L represents a positive integer number, and said memory element being organized with data words stored in said memory element so that $2^L$ unique soft data values are generated by said memory element if the address input of said memory element experiences all of the $2^H$ unique received vector values; and a convolutional decoder having an input coupled to the output of said memory element.

2. An apparatus as claimed in claim 1 wherein the system communicates differentially encoded data and said demodulator comprises a second memory element having a data input coupled to a first portion of the H output bits of said demodulator and a data output which provides a second portion of the H output bits of said demodulator.

3. An apparatus as claimed in claim 2 wherein the system communicates quadrature PSK data and the demodulator additionally comprises a third memory element having a data input coupled to a third portion of the H output bits of said demodulator and having a data output which provides a fourth portion of the H output bits of said demodulator.

4. An apparatus as claimed in claim 3 wherein the demodulator output is organized so that the number H equals 12 and each of the first, second, third, and fourth portions of the H output bits contains 3 bits.

5. An apparatus as claimed in claim 1 wherein data words within said memory element are substantially organized so that:
   each one of the $2^H$ unique received vector values causes said memory element to generate one of the $2^L$ unique soft data values stored within said memory element at the output thereof; and
   data words are stored within said memory element with the unique soft data values being related to received vector values at the predetermined quantization grain so that the sum of probabilities of occurrence for all received vector values which cause said memory element to generate one of the unique soft data values approximately equals the sum of probabilities of occurrence for all received vector values which cause said memory element to generate any other one of the unique soft data values.

6. An apparatus as claimed in claim 5 wherein:
   all of the received vector values which cause said memory element to generate any one of the unique soft data values at the output of said memory element form a single mutually exclusive vector group;
   a total of $2^L$ mutually exclusive vector groups are formed from the $2^H$ unique received vector values; and
   data words within said memory element are substantially organized so that deviation of a Log-Likelihood parameter for each received vector value within a single mutually exclusive vector group, from an average over all Log-Likelihood parameters for that vector group, is less than deviations of all Log-Likelihood parameters for received vector values of other vector groups from said average.

7. An apparatus as claimed in claim 6 wherein:
   said demodulator comprises a quantizer having a grain adjustment input for controlling the quantization grain of said demodulator output and a quantizer output coupled to the output of said demodulator; and
   means, coupled to the quantizer grain adjustment input, for applying a signal to said quantizer grain adjustment input so that a resulting quantization grain causes a $R_{comp}$ parameter of the system to be substantially maximized.

8. A method of providing received information to a convolutional decoder in a system that communicates convolutionally encoded data, said method comprising the steps of:
   demodulating a received signal so that a quantized output exhibiting a predetermined quantization grain and any one of $2^H$, where H is a positive integer number, possible unique received vector values is provided;
   producing, in a memory element with an address input which receives the quantized output, one of $2^L$, where L is a positive integer number, unique soft data values wherein the one soft data value has approximately the same probability of occurrence as any other of the $2^L$ soft data values at the predetermined quantization grain;
   coupling the memory element to the decoder.

9. A method as claimed in claim 8 wherein all of the received vector values which cause said memory element to generate any one of the unique soft data values at the output of said memory element form a single mutually exclusive vector group and said producing step additionally comprises the step of organizing the soft data values in the memory element so that deviation of a Log-Likelihood parameter for each received vector value within a single mutually exclusive vector group, from an average over all Log-Likelihood parameters for that vector group, is less than deviations of all Log-Likelihood parameters for received vector values of other vector groups from said average.

10. A method as claimed in claim 8 wherein said demodulator includes a quantizer with a grain adjustment input and said method additionally comprises the step of energizing the grain adjustment input of the quantizer so that a resulting quantization grain causes a $R_{comp}$ parameter of the system to be substantially maximized.

11. A method as claimed in claim 8 wherein the system communicates differentially encoded data symbols and said demodulating step comprises the step of including in the output from said demodulator a first portion of the received vector value that represents a current symbol and a second portion of the received vector value that represents an immediately previous symbol.

12. A method as claimed in claim 11 wherein:
   the system communicates quadrature PSK data symbols; and
   the first and second portions of the received vector value of said including step represent in-phase portions of a quadrature symbol, and said demodulating step additionally comprises the step of providing in the output from said demodulator a third portion of the received vector value that represents a present, quadrature-phase portion of a symbol and a fourth portion of the received vector value that represents an immediately previous quadrature-phase portion of a symbol.

13. A received-signal processing apparatus for use in a system which communicates convolutionally encoded, differential, quadrature-PSK, said apparatus comprising:
   a demodulator having a quantizer with a grain adjustment input and an output, a first memory element with an input and an output, and a second memory element with an input and an output, said demodulator providing an output presented in H bits, where H is a positive integer number, with first and second portions of the H bits being coupled to the quantizer output and to the inputs of the first and second memory elements, respectively, and the H demodulator output bits including a third portion provided by the first memory element output and a fourth portion provided by the second memory element output, the first, second, third, and fourth portions of the H bits collectively providing one of $2^H$ unique received vector values;
   a third memory element having an address input coupled to said demodulator output so that the one received vector value provided by the output of said demodulator addresses one of a multiplicity of unique data words, the data words being organized so that:

$2^L$, where L is a positive integer number, unique soft data values are generated by said third memory element if the address input of said third memory element experiences all of the $2^H$ unique received vector values, soft data values are related to received vector values so that the sum of probabilities of occurrence for all received vector values which cause said third memory element to generate a particular one of the unique soft data values approximately equals the sum of probabilities of occurrence for all received vector values which cause said third memory element to generate any other one of the unique soft data values, all of the received vector values which cause said third memory element to generate any one of the unique soft data values at the output of said third memory element form a single mutually exclusive vector group, a deviation of a Log-Likelihood parameter for each received vector value within a single mutually exclusive vector group, from an average over all Log-Likelihood parameters for that vector group, is less than deviations of all Log-Likelihood parameters for received vector values of other vector groups from said average; and a convolutional decoder having an input coupled to the output of said memory element.

14. An apparatus as claimed in claim 13 wherein H equals 12 and the first, second, third, and fourth portions of the H output bits at said demodulator output each contain 3 bits.

* * * * *